United States Patent [19]

Whitney

[11] Patent Number: 4,592,428
[45] Date of Patent: Jun. 3, 1986

[54] PLANT PROTECTIVE APPARATUS

[76] Inventor: Everest G. Whitney, P.O. Box 141, Depot St., Burke, N.Y. 12917

[21] Appl. No.: 540,162

[22] Filed: Oct. 7, 1983

[51] Int. Cl.⁴ .............................................. A01B 39/26
[52] U.S. Cl. ...................................... 172/81; 172/42; 172/517
[58] Field of Search ...................... 172/81, 112, 42, 43, 172/509, 510, 511, 512, 513, 508, 517, 41

[56] References Cited

U.S. PATENT DOCUMENTS

| | | | |
|---|---|---|---|
| 869,289 | 10/1907 | Barrett | 172/513 |
| 1,111,967 | 9/1914 | Meeker | 172/513 |
| 2,805,614 | 9/1957 | Lipetzky | 172/512 X |
| 3,901,325 | 8/1975 | Richards | 172/42 |
| 3,985,185 | 10/1976 | Pierce | 172/81 |
| 3,985,186 | 10/1976 | Lee | 172/517 |
| 4,066,130 | 1/1978 | Heppner | 172/509 |
| 4,372,397 | 2/1983 | Goertzen | 172/112 |

FOREIGN PATENT DOCUMENTS 129207  9/1948  Australia .............................. 172/43

Primary Examiner—Richard J. Johnson
Attorney, Agent, or Firm—Paul I. Edelson

[57] ABSTRACT

A plant protective fender for use with earth working machines such as rototillers comprises, in one embodiment for use with machines having rear-mounted tines, a support member fixedly attached at a selectable distance from the frame of the machine and a pair of guard members depending from the support member. The guard members extend from the support member to the housing of the earth working members of the machine, and are attached to the housing at a fixed selectable height. In another embodiment for use with machines having front-mounted tines, the guard members are attached at a fixed selectable point to an attachment member rotatably inserted into the tine shaft and extended forwardly the tines and rearwardly to attachment brackets for attachment to the machine depth gauge. The machine-forward portion of the fender has a central opening about which the fender is curved first in the horizontal plane and then in the vertical plane to provide guiding and deflecting surfaces which will not trap objects within the fender, or bind upon the ground. The remaining portion of the guard members are planar.

11 Claims, 10 Drawing Figures

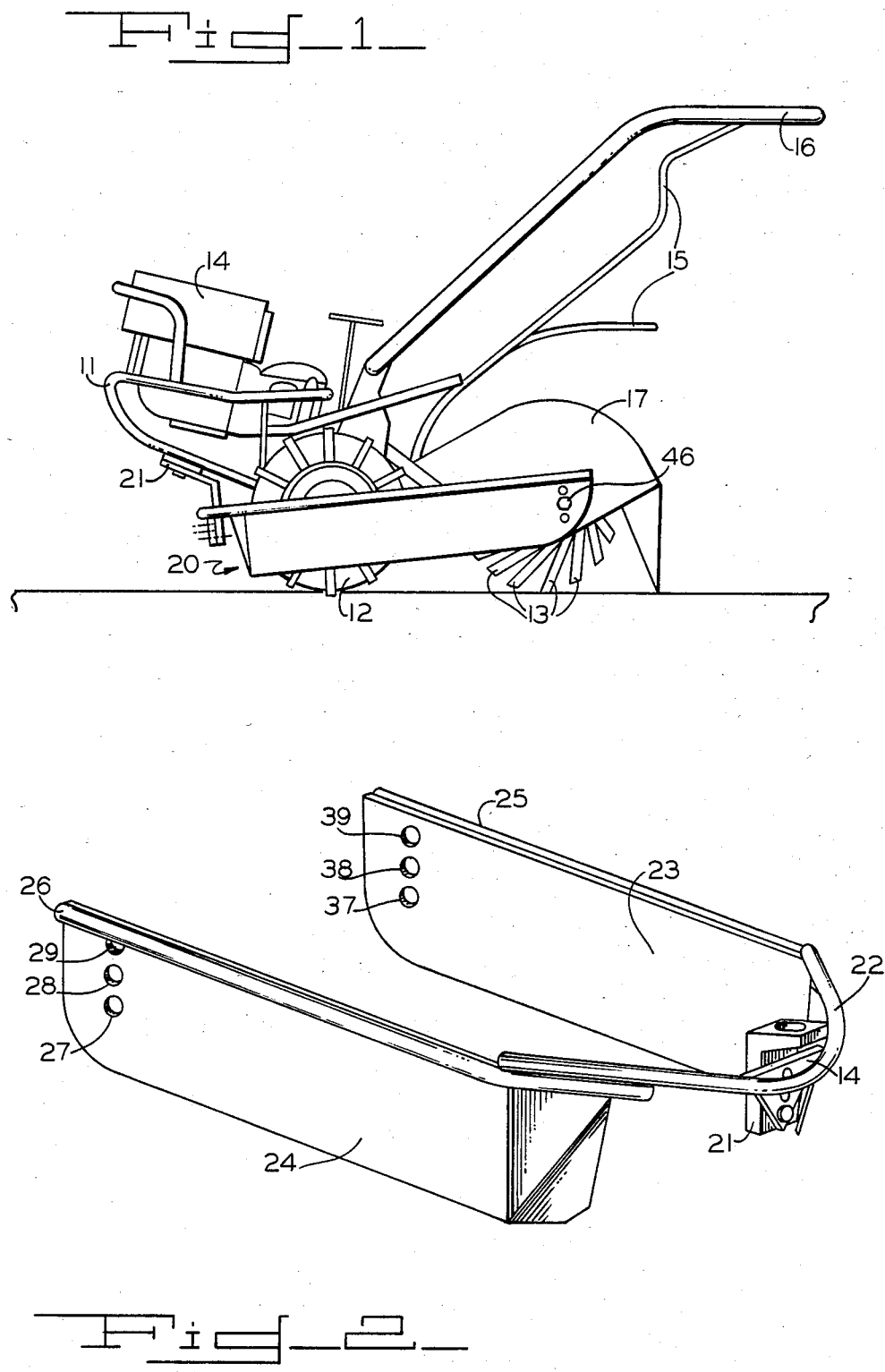

PLANT PROTECTIVE APPARATUS

This invention relates to agricultural or gardening type earth working machines. More particularly, this invention relates to the provision upon such machines of a fender apparatus for protecting plants from damage resulting from the operation of such machines.

Power driven tilling machines are well known in the agricultural arts. These machines typically comprise a frame upon which is supported motor means and control means in spaced relation to the ground and wheels and earth working tines in ground engaging relation. The use of such machines in initial soil preparation, prior to planting, presents no difficulties. However, its is also frequently desired to use such machines for power cultivation between rows of planted crops. In the use of such machines for cultivation, it has been found that plants are frequently damaged. Such damage occurs when the wheels, wheel lugs, or tilling tines come in contact with a portion of the plant, and also when material thrown by the tines strikes a plant. In order to minimize the risk of damage to crops, power cultivating machines have been restricted in use to sufficient distances from the plants that damage becomes unlikely. This, however, limits the area which can be power cultivated, and leaves substantial amounts of hand weeding which must be done.

The prior art has developed a number of plant protective devices for use with power cultivators which have not been fully satisfactory. Many of the prior art devices are disposed about the earth working tines only, and provide no protection for plants against damage by the wheels or wheel lugs. Some of the prior art devices provide a solid flat plate extending completely across the forward portion of the assembly of earth working tines; these devices exhibit the disadvantage known as buldozing, in which the protective device digs into the ground and prevents the machine from performing its intended function, and also disadvantageously serve to trap matter deflected by the earth working tines between such forward plate and the tines, with a risk of jamming the machine. Prior art protective devices are either attached at a fixed, non-adjustable height, which has the disadvantage of being usable only over a small range of the tilling depths available from typical machines, or are "floater"-type in which the forward portion of the device is suspended from the machine frame by a chain, or other flexible element so that the bottom of the device rides along the ground. "Floater" devices are disadvantageous in that they have been known to ride up on plants thereby completely defeating their intended purpose and allowing the plant to be damaged, and in that they are subject to riding up over stones or other objects in their path, thereby exposing plants to damage. Additionally, "floaters" having a continuous solid forward member are particularly susceptable to jamming of the machine by traped debris as mentioned hereinabove. Additionally, many of the intendedly protective devices of the prior art have, themselves, sharp edges so disposed as to contact plants in normal operation with the risk of damaging the plants.

With respect to both the scope of this invention, and the above discussion of the prior art, it should be understood that many types of power cultivation machines are known and used in agriculture and gardening, that the problems of plant protection, and means for providing such plant protection are common among all types of such equipment. For simplicity, further discussion herein of particular embodiments of this invention will be limited to the gardening type cultivating machines commonly known as rototillers. It should be understood that the structures, principles, and practices discussed, however, are applicable to any type of cultivating machine.

It is, accordingly, an object of this invention to provide a fender member for use in conjunction with power cultivating machines to prevent damage to plants from the operation of such machines.

It is another object of this invention to provide such a fender in which all exterior surfaces which might come into contact with plants are smooth, continuous, surfaces.

It is another object of this invention to provide such a fender having means for attaching the fender to the cultivating machine at a preselectable fixed height.

It is another object of this invention to provide such a fender which extends sufficiently along the length of the machine with which it is used to provide debris and plant fending protection both with respect to the wheel assemblies of the machine and the earth working members.

It is another object of this invention to provide such a fender having an open front between mutually facing fender members, which mutually facing fender members are curved to provide deflecting surfaces.

Briefly, and in accordance with one embodiment of this invention a plant protective fender is provided for a rototiller comprising first and second guard members which partially surround both the drive wheels and the earth working tines of the machine. The central portion of the front of the fender is open and the mutually facing edges of the fender across the central opening are formed into deflecting surfaces by being curved first inwardly toward the central opening, and then upwardly over a portion of the inwardly curved surfaces. A bracket member is provided for attachment to the frame of the rototiller. A smoothly curved support member has an attachment tab disposed thereon interior the curve thereof and provides for attachment to the bracket member at various preselectable fixed positions to provide for selection of the height of the fender. In another embodiment, an essentially identical fender is provided with alternative attachment means for attachment to a different type of machine.

The novel features of this invention sought to be patented are set forth with particularity in the appended claims. The invention, together with further objects and advantages thereof, may be understood from a reading of the following specification and appended claims in view of the accompanying drawings in which:

FIG. 1 is a side elevation view of a rear-tiller rototiller machine having a fender in accordance with this invention installed thereon.

FIG. 2 is an isometric drawing of a fender assembly in accordance with one embodiment of this invention.

Figures 3, 4:
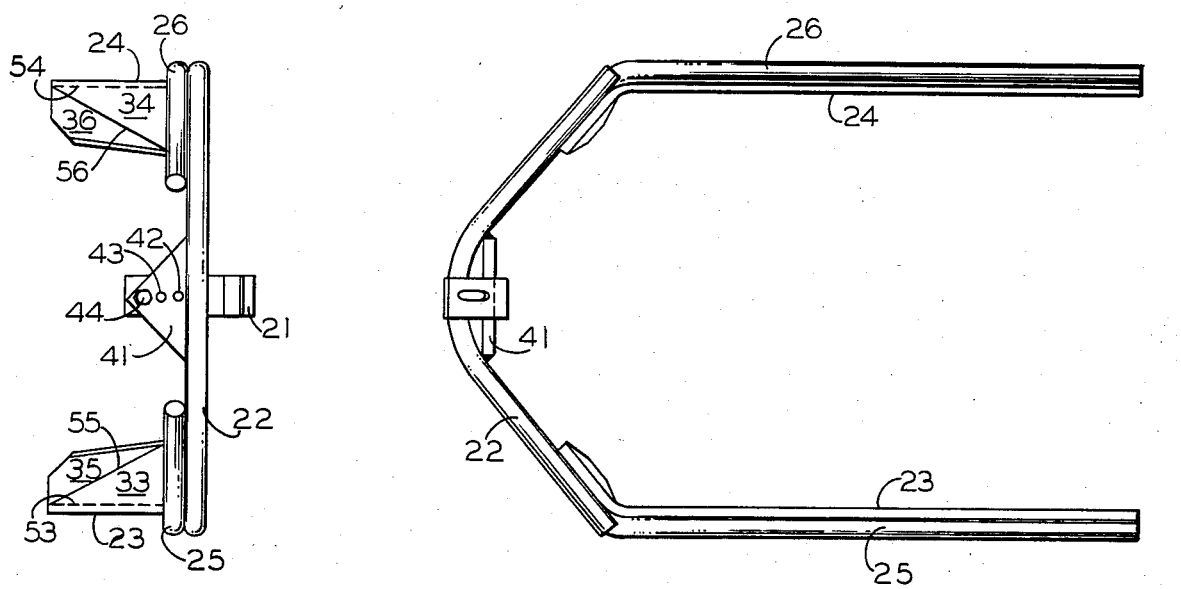
FIG. 3 is a front elevation view of the fender of FIG. 2.
FIG. 4 is a top plan view of the fender of FIG. 2.

FIG. 1 illustrates a gardening type earth-working machine of the sort commonly known as a rototiller, and more particularly, of the variety known as a rear tiller, in which the earth working tines are located at the rear of the machine, having a plant protective device in accordance with this invention installed thereon. The rototiller of FIG. 1 comprises a frame member 11, to which are attached ground engaging drive wheels 12 and earth working tines 13, and a motor 14, controls 15, and handle 16, all supported in spaced relation to the ground. The rototiller also includes a housing 17 for the tine assembly. In accordance with this embodiment of this invention a plant protective fender, indicated generally at 20, is provided and extends from in front of wheels 12 backwardly to tines 13. A bracket, 21, is provided to attach the forward end of fender 20 to the frame of the machine, and the rear end of the fender is attached to the machine at housing 17 by bolt 46.

The details of the construction of the preferred embodiment of fender 20 are illustrated in FIGS. 2–7. FIG. 2 is an isometric view of a fender in accordance with a preferred embodiment of this invention in which the fender comprises first and second guard members, 23 and 24, preferably formed of sheet metal stock having stiffening elements 25 and 26 at the upper edges thereof. Stiffening elements 25 and 26 may be formed by rolling the upper edges of guard members 23 and 24 into tubular segments, or may comprise segments of metal bar stock attached to the upper edges of the guard members. Each of guard members 23 and 24 have, at the rearward portion thereof, a plurality of holes therein, respectively 37, 38, and 39, and 27, 28, and 29, for the attachment of the guard members to housing 17 as shown in FIG. 1 at a preselectable height by selection of one hole from among the plurality of holes in each guard member through which the member will be bolted to the housing. At their forward ends, guard members 23 and 24 are interconnected by support member 22 to form the fender of this invention. Support member 22 is preferably a segment of metal bar stock, and is configured in a smooth continuous curve so as to provide the fender of this invention with a leading edge having no sharp surfaces or discontinuities which might catch or otherwise damage plants in the vicinity of the machine. An attachment plate 41 is firmly attached to support member 22 at the center of the support member and interior the curvature of the support member to provide for connection between bracket 21 and support member 22. The attachment of attachment plate 41 interior to the curve of support member 22 serves to insure that the leading edge of the fender consists of the smooth curve of support member 22, and prevents any possibility of damage to plants by the attachment plate or the depending portion of bracket 21. Attachment plate 41 is preferably attached to support member 22 by spot welding at the upper edge of attachment plate 41, the length of which upper edge is selected to provide the desired set-back from the leading edge of support member 22, and the attachment plate is preferrably triangular in shape to provide mechanical stiffness and reduced area of the portion of attachment plate 41 depending below support member 22. Attachment plate 41 has a plurality of holes therethrough to provide for selection of the height of the machine installed fender above the ground by selection among the holes of the one through which bracket 21 will be bolted to attachment plate 41. Instead of the plurality of holes shown, an elongated slot could be provided in attachment plate 41 so that bracket 21 might be attached thereto at any point along the slot. Because it is desired to fix the height to the fender of this invention at a selected point, however, the plurality of holes, as illustrated, is preferred over the use of a slot, since there would be a possibility of some slipage along a slot.

FIG. 3 shows the leading portion of the fender of this invention in front elevation view. Opposite ends of support member 22 are permanently attached, preferrably by welding, to stiffening elements 25 and 26. The forward portions of guard members 23 and 24, depending respectively from stiffening elements 25 and 26 are first bent inwardly over a small radius centered about, respectively, lines 53 and 54, to form, respectively portions 33 and 34, and are then respectively further bent inwardly and upwardly about a small radius centered respectively on lines 55 and 56 to form portions 35 and 36. The distance between the outer edges of deflector portions 33 and 34 and the inner edges of deflector protions 35 and 36 should be greater than one half the width of the wheel of the machine, and less than the full width of the wheel. The majority of the lower forward portion of the fender of this invention is open. The fender of this invention has been used experimentally, and, in cultivating between rows of corn, it has been found that with stiffening element 26, for example, in light contact with the corn stalks, portions 33 and 34 are fully effective to brush the leaves up and out of the way of damage by the wheels or tines, and portions 35 and 36 are fully effective to prevent any bulldozing. FIG. 3 also clearly illustrates the attachment of the fender of this invention to bracket 21 by attachment plate 41. As was discussed with reference to FIG. 2, attachment plate 41 has a plurality of holes therein, two of which, 42 and 43 are shown in FIG. 3. Another hole in attachment plate 41 is hidden behind support member 22 in FIG. 3, and a final hole, as depicted in FIG. 3 is hidden behind bolt 44 which, cooperatively with a nut, secures attachment plate 41, and thus the fender assembly, to bracket 21 at a position providing maximum elevation of the fender from the ground. A position closer to the ground may obviously be provided for the fender by selecting a higher hole through which to insert bolt 44. Depending upon terrain and crop conditions, the user selects the most appropriate fender height, and affixes bracket 21 through the appropriate hole in attachment plate 41, and affixes the rear portion of guard members 23 and 24 to the tine housing member as hereinabove dicussed through the appropriate hole at the rear of the guard members. Once the fender height is thus selected for a particular task, the fender remains at a fixed height, with the advantages heretofore discussed.

Figure 6:
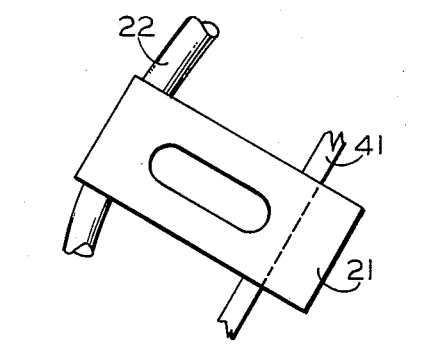
FIG. 6 is a top plan view detail of the bracket member for attachment to the machine frame.

FIGS. 4 and 6 are top elevation views which particularly illustrate the attachment of attachment plate 41 to support member 22 such that support member 22 prevents any damaging contact between foliage and attachment plate 41 and bracket 21. Attachment plate 41 is configured so that the length of its upper edge will form a chord across the central portion of the interior curve of support member 22 set back from support member 22 a distance of 2 to 3 inches. The upper edge of attachment plate 41 is preferably spot welded to support member 22 in this position. Thus, when the fender is moved forwardly, smoothly curved support member 22 serves to guide any foliage encountered out of contact with attachment plate 41 and bracket 21 as well as out of contact with the various parts of the earth working machine. FIG. 4 also illustrates the cooperative interconnection of support member 22, stiffening elements 25 and 26, and guard members 23 and 24 to form a fender having an overall smooth surface without discontinuities which could damage plants.

Figure 5:
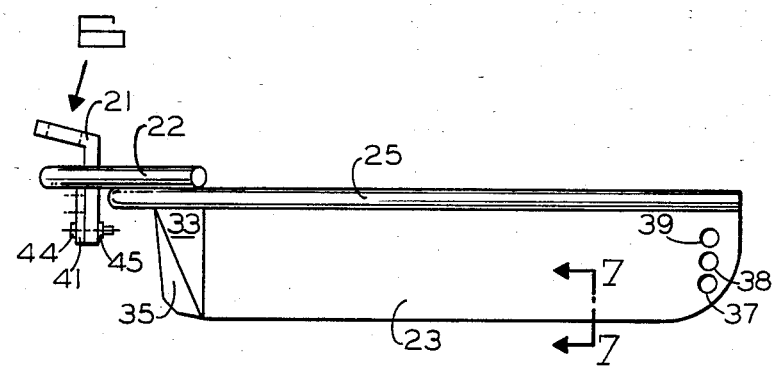
FIG. 5 is a side elevation view of the fender of FIG. 2.

FIG. 5 is a side elevation view of the fender of this invention further illustrating the cooperative configuration of support member 22, stiffening element 25, and guard member 23 to form a continuous fender having no sharp, protruding, or discontinuous edges. FIG. 5 also shows the attachment of bracket 21 to attachment plate 41 by means of bolt 44 and nut 45 whereby the height of the front end of the fender is fixed at its maximum value. The height of the fender can be lowered by bolting bracket 21 to attachment plate 41 at any of the higher holes in attachment plate 41 as discussed hereinabove. Also as previously discussed, FIG. 5 shows a plurality of attachment holes 37, 38, and 39, at the rearward end of guard member 23 by selection among which for attachment to the tine housing member of the machine the height of the rearward section of the fender may be selected and fixed.

Figure 7:
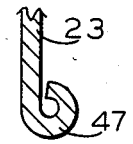
FIG. 7 is s sectional view of the bottom portion of a guard member of the fender taken along line 7—7 of FIG. 5.

FIG. 7 is a cross sectional view of a portion of guard member 23 taken along the line 7—7 as shown in FIG. 5, and illustrates another feature of the preferred embodiment of this invention in which the lower edge of the guard member 23 is rolled inwardly to form an additional stiffening element 47. In addition to providing additional stiffening for guard member 23, additional stiffening element 47 also provides for the presentation of a smoothly curved surface along the lower edge of the guard member, and thus eliminates any possibility of damage to foliage in contact with the lower edge of the guard member.

Figure 8:
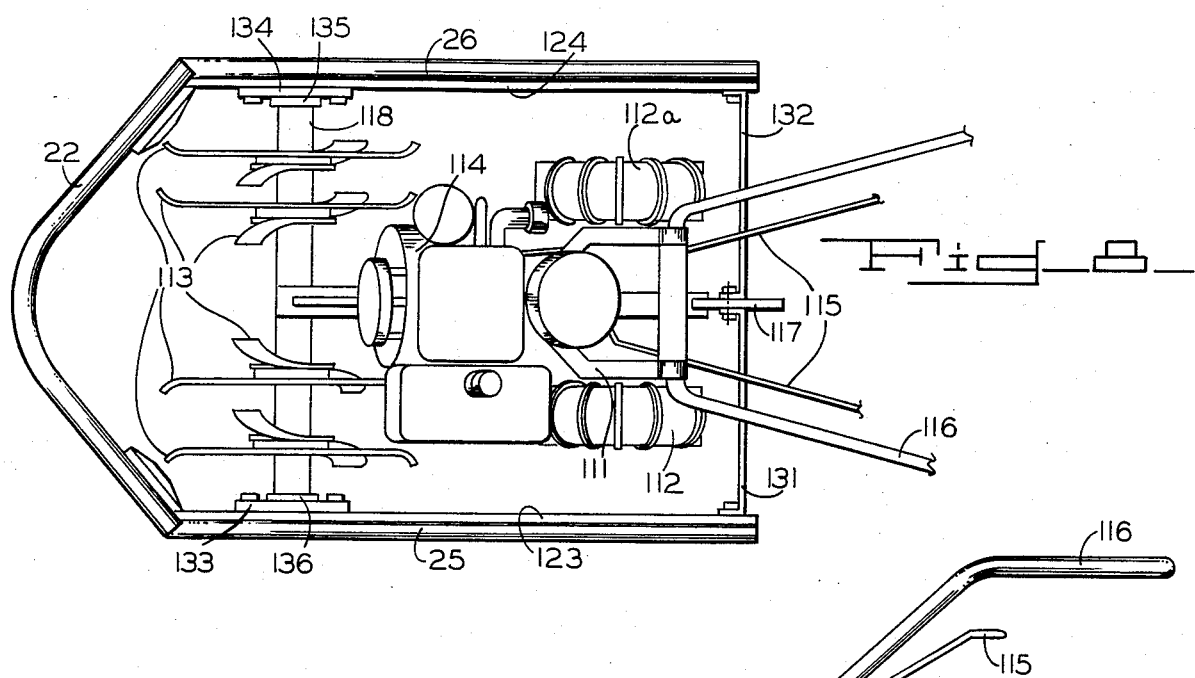
FIG. 8 is a top plan view of a protective fender in accordance with this invention installed upon a different type of rototiller, and having alternative attachment means adapted to the different type of rototiller.
Figure 9:
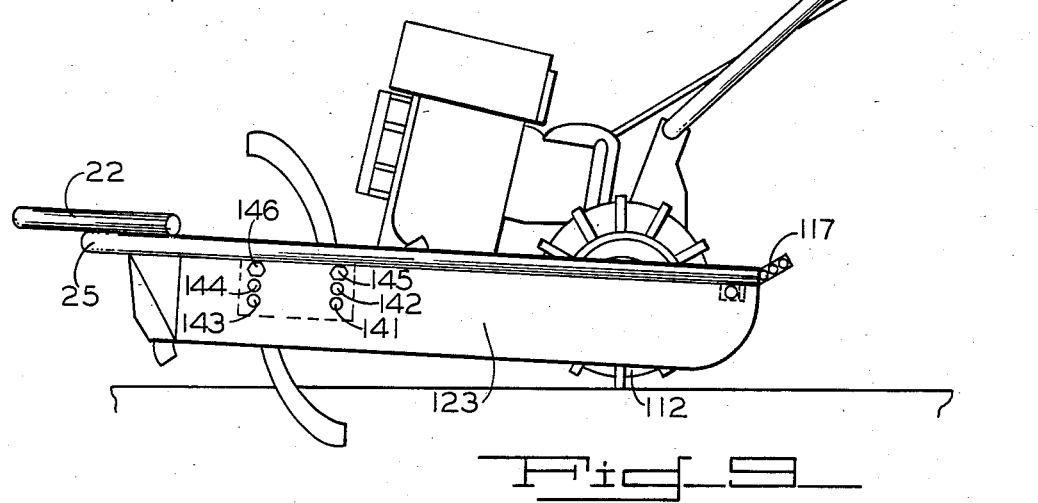
FIG. 9 is a side elevation view of the machine and fender of FIG. 8.

FIG. 8 illustrates another type of rototiller, of the variety known as a front tiller, in which the earth working tines are located at the front of the machine, having a plant protective device in accordance with this invention installed thereon. Similiarly with the rototiller of FIG. 1, the rototiller of FIG. 8 comprises a frame member 111 which supports a motor 114, controls 115, and a handle 116 in spaced relation to the ground and to which are attached earth working tines 113 and idler wheels 112 and 112a in ground engaging relation. In the typical front tiller, the wheels are idler wheels rather than drive wheels as in the case of the rear tiller, the tines are mounted on a hollow shaft 118, and no tine housing is provided. Front tillers also have, typically, a depth gage 117 at the extreme rearward portion of the machine, comprising a perforated segment of metal bar stock. The fender of this embodiment of this invention is essentially identical to the embodiment discussed hereinabove for attachment to rear tillers, and is modified only in providing particular means for attachment of the rototiller to the rototiller which are compatible with the geometry of the front tiller. Thus, support member 22 and stiffening elements 25 and 26 are identical in the embodiment shown in FIGS. 8 and 9 with those elements as shown in FIGS. 1–6 and discussed hereinabove. Guard members 123 and 124 as shown in FIG. 8 are constructed and configured similarly to guard members 23 and 24 as shown in FIGS. 1–5 and discussed hereinabove, and are merely modified, as shown typically with respect to guard member 123 in FIG. 9, by the provision of a plurality of holes 141, 142, 143, 144, and the unseen holes through which bolts 145 and 146 as shown in FIG. 9 pass. The plurality of holes in guard members 123 and 124 provide for attachment of the forward portion of the fender member of this invention to the front tiller at a preselected fixed height.

Figure 10:
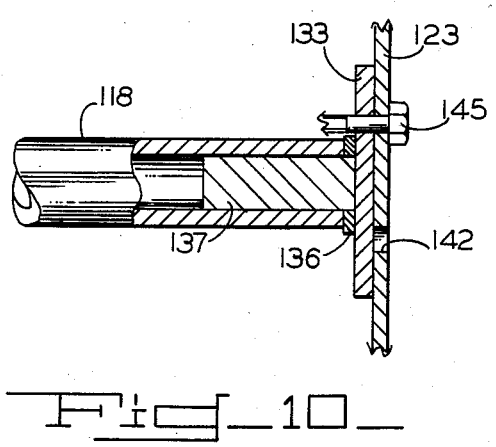
FIG. 10 is a cross sectional view of a portion of the apparatus of FIGS. 8 and 9 illustrating the means for attaching the fender of this invention to the rototiller in accordance with this embodiment of this invention.

The attachment means discussed immediately hereinabove is illustrated in detail in FIG. 10. As shown in FIG. 10, the attachment of the fender of this invention to a front tiller takes advantage of the hollow shaft, 118, of the machine upon which the tines are mounted. A stub shaft, 137 dimensioned to be slidably received within hollow shaft 118 is attached to a mounting plate 133. A washer, 136, is preferably disposed about stub shaft 137 and between the end of hollow shaft 118 and mounting plate 133 to provide for the desired spacing of the guard member and to prevent shaft 118 and mounting plate 133 from abrading each other. Mounting plate 133 has a pair of holes therein for receiving bolts 145 and 146 as shown in FIG. 9 to thereby attach guard member 123 thereto at a height determined by the selection among the plurality of holes in guard member 123 through which the bolts are passed. Returning to FIG. 8, guard member 124 is similarly attached to the opposite end of hollow shaft 118 from the attachment of guard member 123 by similar apparatus of which mounting plate 134 and washer 135 are shown in FIG. 8.

The rearward portion of the fender of this invention is attached to the machine, as shown in FIG. 8, by the attachment of U brackets 131 and 132 between, respectively, guard member 123 and depth gauge 117 and guard member 124 and depth gauge 117. Depth gauge 117 is disposed to form an angle of approximately 40° with the horizontal and so provides for the selection of the height of the rearward portion of the fender of this invention by rotation of U brackets 131 and 132 prior to attachment to select among the holes in debth gauge 117 for attachment.

While this invention has been described with reference to particular embodiments and examples, other modifications and variations will occur to those skilled in the art, in view of the above teachings. Accordingly, it should be understood that within the scope of the appended claims, the invention may be practiced otherwise than is specifically described.

The invention claimed is:

1. Apparatus for protecting plants from damage from the operation of agricultural or gardening type earth working machines having a frame member supporting motor means and control means in spaced relation to the ground, and earth working members having a housing disposed thereabout and drive members in mutually spaced ground engaging relation, said apparatus comprising:

a fender member partially surrounding said earth working members and said drive members;

means for attaching a first end of said fender member to said frame member proximately said drive members;

means for attaching a second end of said fender member to said housing;

and wherein said means for attaching said first and second ends of said fender member support said fender member in a fixed spaced relation to said frame member;

said means for attaching one of said ends includes means for selecting the distance of said fixed spaced relation;

said means for attaching the other of said ends is means for pivotably attaching; and wherein said fender member more particularly comprises:

a rigid support member;

a bracket member for attaching said support member to said frame member;

first and second guard members attached to said support member at a first end of each said guard member and having means for attaching a second end of each of said guard members to said housing.

2. The apparatus of claim 1 wherein said bracket member includes means for adjusting the distance between said support member and said frame member.

3. The apparatus of claim 1 wherein said support member comprises a segment of metal bar stock configured in a smooth curve.

4. The apparatus of claim 1 wherein said guard members comprise segments of sheet metal stock.

5. The apparatus of claim 4 wherein an upper edge of each said guard member is rolled to form a stiffening element.

6. The apparatus of claim 5 wherein a lower edge of each said guard member is rolled to form a stiffening element having a smooth curved surface.

7. The apparatus of claim 4 wherein said upper edge of each said guard member is welded to said support member in such position that a gap exists between mutually facing edges of said guard members along said support member.

8. The apparatus of claim 7 wherein said mutally facing edges are curved inwardly toward each other, said curving being along a line essentially perpendicular to said lower edge.

9. The apparatus of claim 8 wherein said mutally facing edges are curved upwardly over a portion thereof disposed inwardly of said inward curving, said upward curving being along a line oblique to said lower edge.

10. Apparatus as claimed in claim 1 wherein said guard members have planar outer surfaces between said support member and said housing.

11. The apparatus of claim 10 wherein each said guard member has a plurality of said means for attaching a second end thereof to said housing, each means of said plurality of means being in spaced relation to each of the others to provide for height adjustment of said fender by selection among said means for attaching a second end of each of said guard members to said housing.

* * * * *